(12) United States Patent
Linden et al.

(10) Patent No.: US 9,655,129 B2
(45) Date of Patent: May 16, 2017

(54) BUNDLING OF PACKET ACKNOWLEDGMENTS AS A FUNCTION OF THE DISTANCE

(71) Applicant: Kyynel Oy, Oulu (FI)

(72) Inventors: Toni Linden, Kempele (FI); Teemu Vanninen, Oulu (FI); Matti Raustia, Oulu (FI)

(73) Assignee: KYYNEL OY, Oulu (FI)

( * ) Notice: Subject to any disclaimer, the term of this patent is extended or adjusted under 35 U.S.C. 154(b) by 0 days.

(21) Appl. No.: 14/374,291

(22) PCT Filed: Nov. 27, 2012

(86) PCT No.: PCT/FI2012/051170
§ 371 (c)(1),
(2) Date: Jul. 24, 2014

(87) PCT Pub. No.: WO2013/113978
PCT Pub. Date: Aug. 8, 2013

(65) Prior Publication Data
US 2015/0327278 A1 Nov. 12, 2015

(30) Foreign Application Priority Data
Jan. 31, 2012 (FI) ..................................... 20125097

(51) Int. Cl.
*H04W 72/08* (2009.01)
*H04W 24/08* (2009.01)
(Continued)

(52) U.S. Cl.
CPC ........... *H04W 72/08* (2013.01); *H04L 1/1621* (2013.01); *H04L 1/1635* (2013.01); *H04L 69/22* (2013.01);
(Continued)

(58) Field of Classification Search
None
See application file for complete search history.

(56) References Cited

U.S. PATENT DOCUMENTS

2005/0201354 A1* 9/2005 Hosaka ................. H04L 1/1887
370/349
2006/0030311 A1* 2/2006 Cruz ..................... H01Q 1/246
455/431
(Continued)

FOREIGN PATENT DOCUMENTS

WO WO0122645 A1 3/2001
WO WO0209342 A2 1/2002
(Continued)

OTHER PUBLICATIONS

"Multiple ACK/NACKs transmission for TDD", 3GPP TSG RAN WG1 meeting #52bis, R1-081325, Mar. 31-Apr. 4, 2008.*
(Continued)

*Primary Examiner* — Mohammad Adhami
(74) *Attorney, Agent, or Firm* — Hoffmann & Baron, LLP (57) ABSTRACT

A method and an apparatus for bundling data packet acknowledgments in a wireless communication device is disclosed. The method includes determining a metric proportional to a communication distance between the wireless communication device and a counterpart wireless communication device; selecting a number of data packet acknowledgments to be bundled together according to the determined communication distance such that when the communication distance is higher, the higher number of data packet acknowledgments are bundled together into a single acknowledgment message; and causing transmission of the acknowledgment message comprising the selected number of data packet acknowledgments.

20 Claims, 3 Drawing Sheets

(51) Int. Cl.
*H04W 24/02* (2009.01)
*H04L 29/06* (2006.01)
*H04L 1/16* (2006.01)
*H04W 88/02* (2009.01)

(52) U.S. Cl.
CPC ........... *H04W 24/02* (2013.01); *H04W 24/08* (2013.01); *H04W 88/02* (2013.01)

(56) References Cited

U.S. PATENT DOCUMENTS

| | | | |
|---|---|---|---|
| 2006/0048034 A1 | 3/2006 | Cho | |
| 2009/0257408 A1* | 10/2009 | Zhang | H04L 1/1621 370/336 |
| 2009/0279460 A1* | 11/2009 | Sarkar | H04L 1/16 370/280 |
| 2011/0075611 A1* | 3/2011 | Choi | H04L 1/1819 370/329 |
| 2011/0149756 A1* | 6/2011 | Chan | G01S 5/14 370/252 |
| 2012/0002578 A1* | 1/2012 | Ji | H04L 1/16 370/281 |
| 2013/0021920 A1* | 1/2013 | Nakao | H04L 1/0027 370/242 |

FOREIGN PATENT DOCUMENTS

| | | | |
|---|---|---|---|
| WO | WO2007130746 A2 | | 11/2007 |
| WO | WO2011125320 | * | 4/2011 |

OTHER PUBLICATIONS

Wall, et al., "Adaptive Multimedia Packet Transmission for Broadband IEEE 802.11 Wireless Lans", 17th Annual Int. Symp. on Personal, Indoor and Mobile Radio Communications (PIMRC'06), pp. 1-5 (Sep. 2006).
CATT: "Multiple ACK/NACKs Transmission for TDD", vol. RAN WG1, No. Shenzhen, China, Mar. 26, 2008; pp. 1-4 (Mar. 2008).
ZTE: "ACK/NACK Design for LTE-Advanced", No. Jeju; Nov. 9, 2009, pp. 1-8 (Nov. 2009).
Samsung: "Further Refinement on ACK/NACK Multiplexing in TDD", No. Prague, Czech Republic; Nov. 4, 2008, pp. 1-6 (Nov. 2008).
Nokia Siemens Networks et al: "Coverage Enhancement for Medium Data Rate", vol. Ran WG1, No. Dresden, Germany, Feb. 6, 2012-Feb. 10, 2012; pp. 1-4 (Jan. 2012).
NTT DOCOMO et al: "Repetition of ACK/NACK in E-UTRA Uplink", vol. RAN WG1, No. Seoul, Korea; Oct. 4, 2006, pp. 1-8 (Oct. 2006).
International Search Report, Application No. PCT/FI2012/051170, pp. 1-14, dated Mar. 6, 2013.
Finnish Search Report, Application No. 20125097, pp. 1-2, dated Aug. 31, 2012.

* cited by examiner

BUNDLING OF PACKET ACKNOWLEDGMENTS AS A FUNCTION OF THE DISTANCE

CROSS-REFERENCE TO RELATED APPLICATIONS

This application is a National Stage application of International Application No. PCT/FI2012/051170, filed Nov. 27, 2012, which claims benefit to Finnish Application No. FI20125097, filed Jan. 31, 2012, which are incorporated by reference herein in their entirety.

BACKGROUND

Field

The invention relates to the field of radio communications and, particularly, to handling acknowledgment messages.

Description of the Related Art

In modern radio communication systems utilizing packet transmissions, a receiver acknowledges reception of a data packet by transmitting an acknowledgment message. The acknowledgment typically comprises a positive acknowledgment (ACK) to indicate correct reception of the data packet and a negative acknowledgment (NAK) or no acknowledgment to indicate erroneous or no reception of the data packet. Some systems utilize bundling of acknowledgments, wherein the receiver bundles a plurality of acknowledgments to the same acknowledgment message according to a criterion.

SUMMARY

According to an aspect of the present invention, there is provided a method for bundling data packet acknowledgments in a wireless communication device, the method comprising: determining a metric proportional to a communication distance between the wireless communication device and a counterpart wireless communication device; selecting a number of data packet acknowledgments to be bundled together according to the determined communication distance such that when the communication distance is higher, the higher number of data packet acknowledgments are bundled together into a single acknowledgment message; and causing transmission of the acknowledgment message comprising the selected number of data packet acknowledgments.

According to another aspect of the present invention, there is provided an apparatus comprising: at least one processor; and at least one memory including a computer program code. The at least one memory and the computer program code are configured, with the at least one processor, to cause the apparatus to: determine a metric proportional to a communication distance between the apparatus and a counterpart apparatus; select a number of data packet acknowledgments to be bundled together according to the determined communication distance such that when the communication distance is higher, the higher number of data packet acknowledgments are bundled together into a single acknowledgment message; and cause transmission of the acknowledgment message comprising the selected number of data packet acknowledgments.

Embodiments of the invention are defined in the dependent claims.

BRIEF DESCRIPTION OF THE DRAWINGS

Embodiments of the present invention are described below, by way of example only, with reference to the accompanying drawings, in which.

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
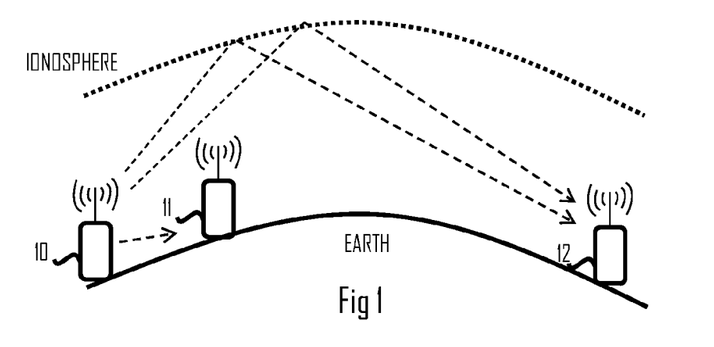
FIG. 1 illustrates a wireless communication scenario to which embodiments of the invention may be applied.

FIG. 1 illustrates an exemplary wireless telecommunication system to which embodiments of the invention may be applied. Embodiments of the invention may be realized in a wireless ad hoc network comprising a plurality of network nodes 10, 11, 12 that may be realized by radio communication apparatuses. The ad hoc network may refer to a network that is established between the network nodes 10 to 12 without any network planning with respect to the infrastructure and/or frequency utilization. The network nodes may be operationally equivalent to each other. At least some of the network nodes 10 to 12 are free to move, and they may also be configured to route data packets that are unrelated to their own use, e.g. data packets of other network nodes. However, it should be understood that principles of the invention may be applied to other types of communication systems, e.g. wireless mesh networks, communication systems having a fixed infrastructure such as cellular communication systems, and other types of systems. The principles of the invention may also be applied to point-to-point connections, wherein two network nodes communication directly with each other without using any other network node to route the data packets.

In the embodiment of FIG. 1, the network nodes 10 to 12 have a very long communication range (even a thousand or thousands of kilometres), and they may communicate directly with network nodes on the other side of the Earth. In general, the communication distance may extend beyond a radio horizon of the network nodes 10 to 12. A generic equation for computing the radio horizon may be presented as $D_{rh}=3.569(\sqrt{h_1}+\sqrt{h_2})$, where $h_1$ and $h_2$ represent heights of communicating network nodes. The capability of communicating beyond the radio horizon may be achieved by appropriate selection of operating frequency, e.g. the operating frequency may be restricted to below very high frequencies (VHF), but in some embodiments even frequencies on a lower half of the VHF band are used. The network nodes 10 to 12 may also communicate with satellites orbiting at the height of 160 kilometres (Low Earth Orbit, LEO), for example. From this point of view, the communication distance may be higher than a 150 kilometres.

On the other hand, the network nodes 10 to 12 may communicate with network nodes located in close distance, e.g. a few kilometres or even less. Their transmit powers may vary from a few Watts (e.g. 20 to 50 W) to even kilo Watts, depending on whether the network node is mobile or fixed and the type of power supply. For example, a network node installed to a building, a truck, or a ship may utilize high transmit powers, while a hand-held device may be limited to the few Watts. The frequency band utilized by the network nodes 10 to 12 may comprise a high frequency (HF) band (3 to 30 MHz), but it should be understood that other embodiments utilize other frequency bands, e.g. VHF or ultra-high frequencies (UHF). An advantage of HF frequencies is their long propagation range, and the fact that they may propagate via several types of communication paths. FIG. 1 illustrates a scenario where a first network node 10 communicates with a second network node 11 over surface radio waves that propagate close to the ground surface. However, a third network node 12 on the other side of the Earth may be reached via radio waves that propagate by utilizing ionospheric reflections. Some network nodes may be reached by using both surface waves and ionospheric reflections. In some scenarios, a radio signal emitted by the first network node 10 may reach the second network node 11 close to the first network node 10 through the ionospheric reflection waves. This type of propagation may be called "Near Vertical Incidence Skywave". In such scenarios, the surface radio wave component may or may not be present. Typically one of the two propagation types dominates by providing a stronger signal in the receiver.

Figure 2:
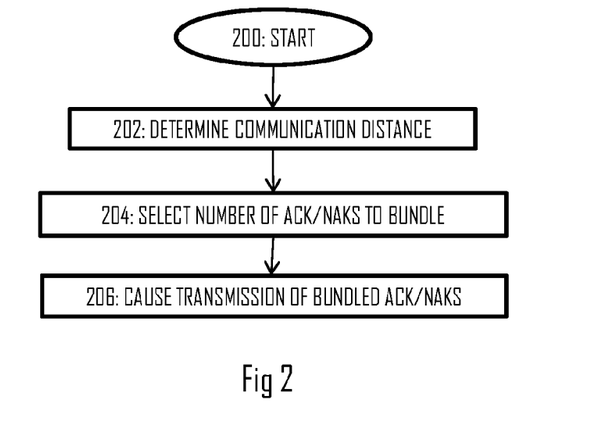
FIG. 2 is a flow diagram of a process for determining the number of bundled acknowledgments according to an embodiment of the invention.

Such a high variation in the communication distance may require adaptive selection of communication parameters. Embodiments of the invention relate to selecting the number of bundled acknowledgments according to the communication distance in an automatic repeat request (ARQ) process. FIG. 2 illustrates a flow diagram of a process for operating a radio communication apparatus to select the number of bundled acknowledgments and cause transmission of an acknowledgment message comprising the selected number of bundled acknowledgments. Referring to FIG. 2, the process starts in block 200. The start of the process may be triggered upon starting a data packet transmission between a transmitter and a receiver, wherein the transmitter and the receiver may each be any one of the wireless communication apparatuses 10 to 12. From one viewpoint, the transmitter and the receiver may be understood as a wireless communication apparatus and a counterpart wireless communication apparatus, wherein the counterpart refers to the data transmission. In block 202, a metric proportional to a communication distance between the transmitter and the receiver is determined. Embodiments of the metric are described below. The metric may represent the communication distance as physical distance or as a time or communication delay based distance. In block 204, a number of data packet acknowledgments to be bundled together according to the determined communication distance is selected. The selected number of bundled acknowledgments is proportional to the communication distance, e.g. more data packet acknowledgments are bundled together in a single acknowledgment message for a longer communication distance than for a shorter communication distance. In block 206, transmission of the acknowledgment message comprising the selected number of data packet acknowledgments is triggered. Further embodiments of block 206 are described below.

Bundling the acknowledgment messages proportionally to the communication distance provides improved data rates in both short and long communication distances. The inventors have discovered that by using a fixed number of bundled acknowledgments results in an optimal solution for only the short distance (a few kilometres) or the long distance. For example, with a low number of bundled acknowledgments a good data rate may be achieved for the short distance, while the data rate of the high distance degrades, because the transmitter has to wait for the acknowledgments of old data packets before it can send new ones. On the other hand, with a high number of bundled acknowledgments a good data rate may be achieved for both the short distance and the long distance in an optimal case where no retransmissions are needed but, in case of needed retransmissions, a packet delay of the short communication distance may become sub-optimal. Therefore, it is optimal to select a low number of bundled acknowledgments for the short distance to achieve high data rates and low delays and to select a high number of bundled acknowledgments for the long distance to achieve at least high data rates.

In an embodiment, the metric representing the communication distance is formed from at least one of the following: known locations of the transmitter and the receiver, a round-trip-time of the connection between the transmitter and the receiver, and a path loss estimate based on estimation of a received signal strength as computed by the receiver from a signal received from the transmitter. With respect to the embodiment using the locations, the locations of the transmitter and the receiver may be determined by using a location tracking system, e.g. a Global Positioning System (GPS). The transmitter and the receiver may inform each other about their respective locations by exchanging location coordinates, and the distance may be computed from the location coordinates. With respect to the embodiment using the round-trip-time, the round-trip-time may be determined by a conventional "ping" request or by transmitting another signal and measuring a time between the transmission of the signal and reception of a response signal. The system may utilize dedicated signalling for measuring the round-trip-time. In such an embodiment, when a device (the transmitter or the receiver) receives such a signal to which it should respond so as to enable measurement of the round-trip-time, the device may determine a default procedure related to processing and transmitting the response signal. If for some reason the processing and the transmission of the response signal is delayed, the device may include in the response signal an information element indicating the delay in the processing. Then, another device receiving the response signal may reduce the delay from the measured total delay so as to determine the real round-trip-time. In an embodiment, the request signal may be a request-to-send (RTS) message, and the response signal may be a clear-to-send (CTS) message related to preparing for the transmission of at least one data packet from a transmitter to a receiver. In another embodiment, the round-trip-time may be determined by carrying out a first transmission between two devices without bundling the acknowledgment, e.g. by transmitting an acknowledgment to a first data packet in a first transmission opportunity of the acknowledgment message, wherein the acknowledgment message comprises only one data packet acknowledgment. Then, the transmitter of the data packet may compute the round-trip-time from a time difference between the transmission of the first data packet and reception time of the acknowledgment message acknowledging the reception of the first data packet. Thereafter, the acknowledgment bundling may by triggered. In an embodiment where the transmitter and the receiver are synchronized to a common clock, the distance may be determined from one signal transmitted to a one direction. In the synchronized system, the party receiving the signal may have the knowledge of the transmission time of the signal, and it may compute the communication distance from the known transmission time and reception time of the signal with a simple subtraction operation and, optionally, mapping the result to a distance metric.

With respect to the embodiment using the path loss or equivalent metric computed from the received signal strength, the received signal strength may be measured from a pilot signal or another signal transmitted with a known transmit signal strength. With the knowledge of the transmit signal strength, and the received signal strength, e.g. signal power, the attenuation caused by a radio channel may be estimated, and the attenuation may be mapped to a database linking the attenuations to average communication distances. The estimate may not be entirely accurate because of variable radio channels but it should be appreciated that some embodiments of selecting the number of bundled acknowledgments do not necessitate an entirely accurate estimate of the communication distance.

In an embodiment, the number of bundled acknowledgments is a semi-static parameter, and it is computed casewise, e.g. per a Medium Access Control (MAC) session. The MAC session may be defined as a transmission opportunity or a session in which a transmitter gains access to a communication channel and transmits a plurality of data packets to a receiver. The MAC session may be a continuous period of time reserved for the transmitter through a request-to-send (RTS) and clear-to-send (CTS) handshake with the receiver or through any other channel reservation scheme. The MAC session may end when the reservation expires (time limitation), the quality of the communication channel is detected to degrade below a threshold level, a transmission buffer is cleared of transmission data, or a higher layer cancels the MAC session in the transmitter. When the MAC session is long, e.g. minutes or even higher, the number of bundled acknowledgments may be recomputed during the MAC session. In other embodiments, the same number of bundled acknowledgments is used throughout the MAC session, and the new number of bundled acknowledgments may be computed for the subsequent MAC session. As a consequence, the change in any one of the parameters affecting the number of bundled acknowledgments, e.g. the communication distance, may cause the number of bundled acknowledgments to vary between the consecutive MAC sessions. This makes the method according to some embodiments of the invention very adaptive to changing environments.

Figure 3:
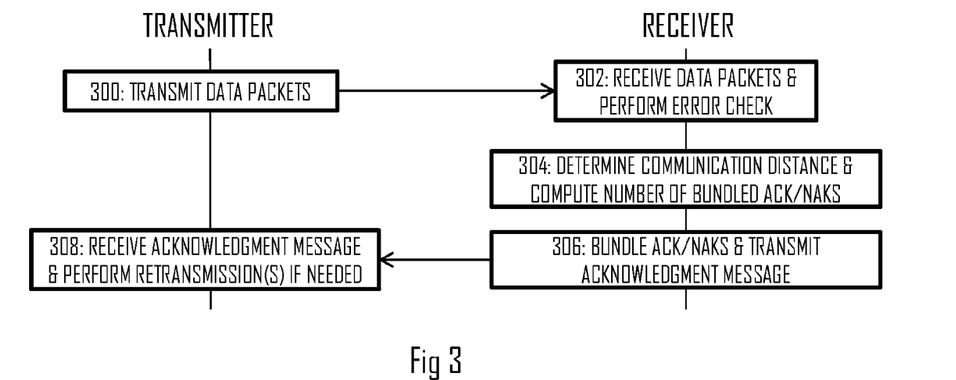
FIGS. 3 and 4 illustrate embodiments for determining the number of bundled acknowledgments and causing transmission of an acknowledgment message comprising the determined number of acknowledgments.

Let us now consider some embodiments of the flow diagram of FIG. 2 and, particularly, to different embodiments for realizing block 206. FIG. 3 illustrates a signalling diagram of an embodiment in which the receiver determines the (radio) communication distance and determines autonomously the number of acknowledgments to be bundled together. It is obvious to the person skilled in the art that the roles "transmitter" and "receiver" relate only to the context where data packets are transmitted from the transmitter to the receiver, and the roles may be reversed for situations where the data packets are transmitted to the opposite direction. Referring to FIG. 3, the transmitter prepares and transmits data packets to the receiver in block 300. The transmitter may also store identifiers of the transmitted data packets in a list of unacknowledged data packets. In block 302, the receiver receives the data packets and processes them one at a time, for example. The processing may comprise performing error correction and detection on the data packets so as to determine whether or not each data packet was received correctly. The receiver may then prepare an acknowledgment for each data packet, wherein the acknowledgment maybe provided with an identifier indicating to which each acknowledgment relates, e.g. a frame number. In block 304, the receiver determines the number of acknowledgments to be bundled together by first determining at least the communication distance and then computing the number of acknowledgments to be bundled. The receiver may determine the communication distance, for example, from the latest available knowledge about the distance, e.g. information achieved in connection with previous RTS-CTS handshake or the latest location information. The latest RTS-CTS handshake may relate to the timing when the receiver previously transmitted data packets to the transmitter. Block 304 may alternatively be carried out before block 302. In block 306, the receiver bundles the number of acknowledgments determined in block 304 into a single acknowledgment message and transmits the acknowledgment message to the transmitter. In block 308, the transmitter receives the acknowledgment message and processes the message so as to determine whether or not at least some of the data packets transmitted in block 300 were received correctly (ACK) or erroneously (NAK). The transmitter may remove from the list of unacknowledged data packets at least those data packets that were received correctly and carry out a retransmission of at least some of the data packets that were received erroneously. The same bundling of acknowledgments may be applied to the initial transmissions and retransmissions of the data packets.

Figure 4:
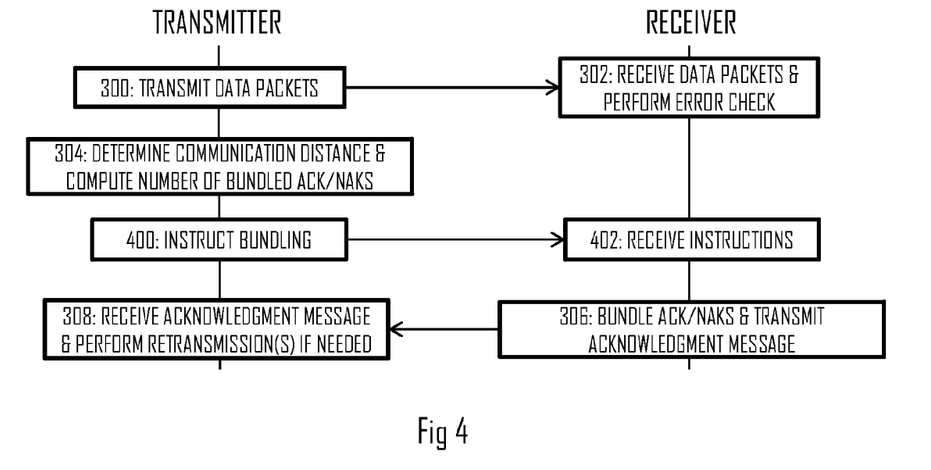
Figure 5:
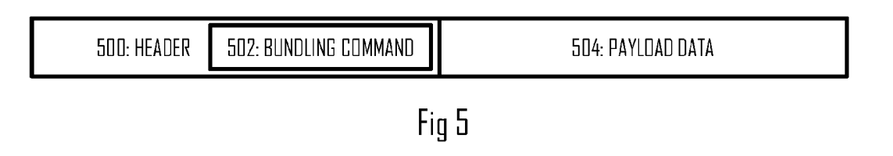
FIG. 5 illustrates an embodiment of a data packet comprising a bundling command in a header according to an embodiment of the invention.

FIG. 4 illustrates a signalling diagram of an embodiment in which the transmitter determines the (radio) communication distance and determines autonomously the number of acknowledgments to be bundled together. The steps with the same reference signs as in FIG. 3 have essentially the same functionality. Consequently, the transmitter transmits and the receiver receives the data packets in blocks 300 and 302. Now, the transmitter carries out block 304 and determines the number of ACK/NAKs to be bundled into the same acknowledgment message. In block 400, the transmitter transmits a bundling command message instructing the number of ACK/NAKs to be bundled to the receiver. The bundling command message may be included in a data packet transmitted by the transmitter to the receiver. FIG. 5 illustrates an embodiment of such a data packet carrying the bundling command. The data packet comprises a header 500 carrying control information including the bundling command 502 and a payload portion 504 carrying payload data to the receiver.

In an embodiment, the bundling command 502 is a bit or byte value that indicates explicitly the number of acknowledgments to be bundled together. For example, if it is determined in block 304 that 20 acknowledgments are to be bundled together, the bundling command may carry a bit combination that indicates value 20. Upon receiving the bundling command 502 in block 402, the receiver may wait for the reception of at least the indicated number of data packets and then include the acknowledgments into the same acknowledgment message in block 306. This embodiment may be realized such that block 304 is carried out before block 300 or in block 300.

In another embodiment, the bundling command is a one-bit indicator, and the transmitter may use the bundling command to trigger the transmission of the acknowledgment message. For example, the bundling command may carry one bit value to indicate that the transmission is not triggered and a different bit value to trigger the transmission of the acknowledgment message. The transmitter may count the number of unacknowledged data packets and, until the number reaches a determined value, the transmitter may configure the bundling command to carry a value that does not trigger the transmission of the acknowledgment message. However, upon reaching the determined value, the transmitter may configure the bundling command to carry a value that triggers the transmission of the acknowledgment message. Upon reception of each data packet, the receiver may be configured to check the bundling command. If the bundling command carries the value that does not trigger the transmission of the acknowledgment message, the receiver may simply process the data packet, determine whether to respond to the data packet with an ACK or NAK and buffer the acknowledgment value. If the bundling command carries the value that triggers the transmission of the acknowledgment message, the receiver may prepare an acknowledgment message and insert into the acknowledgment message all the buffered acknowledgments. In yet another embodiment, the transmitter prepares a dedicated bundling command message that triggers the transmission of the acknowledgment message in response to the bundling command message. The bundling command message may be understood as an acknowledgment request message, and the acknowledgment message as an acknowledgment response message that responds to the acknowledgment request message.

As mentioned above, the effective data rate increases with the increase in the number of bundled acknowledgments. However, in a real scenario where packet losses occur, too high number of bundled acknowledgments results in an increased delay caused by the delayed acknowledgment to an individual data packet. The delay is caused by a waiting time when the receiver waits for the reception of the determined number of data packets before transmitting the acknowledgment message. In case of a given data packet is lost a number of times, e.g. an initial transmission and one or more retransmissions fails, the overall delay may be high. Furthermore, the inventors have discovered that the increase in the effective data rate achievable by the increase in the number of bundled data packets follows a logarithmic function where the increase in the effective data rate saturates. The point of saturation is dependent at least on the communication distance, wherein the saturation is achieved with a lower number of bundled acknowledgments when the communication distance is low. For example, in one case it was discovered that when the communication distance was 50 kilometres (km) the saturation of the data rate was achieved with five (5) bundled acknowledgments, while when the communication distance was 10 000 kilometres (km) the saturation of the data rate was not reached even after fifty (50) bundled acknowledgments. Other parameters may also affect the point of saturation, as shown below. However, the delay may start to play a higher role than the physical data rate, depending on the real-time requirements of an application using the data transfer service. Therefore, an embodiment provides an upper limit to the number of bundled acknowledgments in order to keep the delay tolerable even in the case of multiple losses of the same data packet. The actual value of the upper limit may be determined depending on the system specifications and the applications using the data transfer service. The upper limit may even be made adaptive and determined case-wise on the basis of the real-time requirements of the application, for example. A lower upper limit may be selected to the applications setting high real-time demands, e.g. a voice communication connection, thus trading the data rate to the lower delay. On the other hand, a higher upper limit may be selected to the applications setting low real-time demands, e.g. an e-mail or another messaging application, thus resulting in higher data rates and possibly a high delay.

Figure 6:
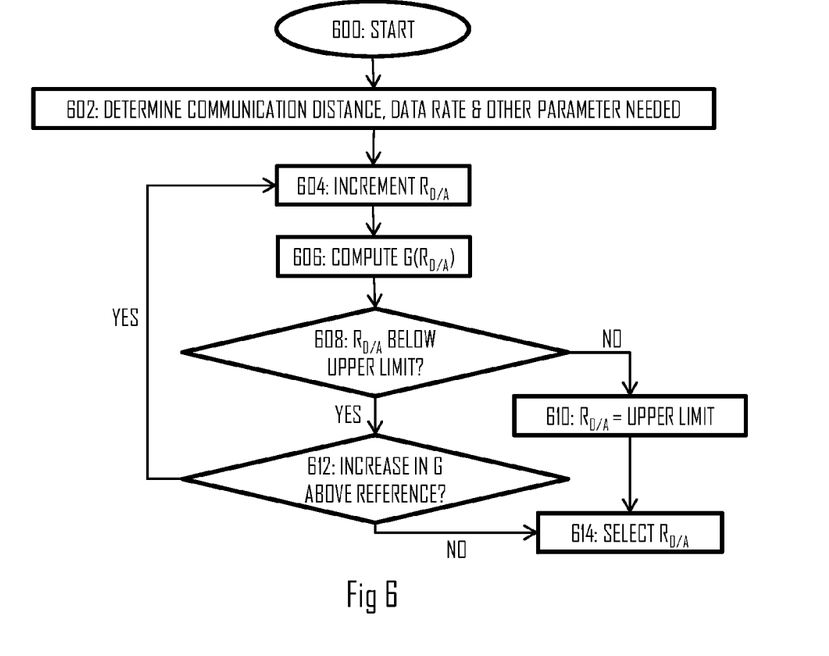
FIG. 6 illustrates a flow diagram of an algorithm for computing the number of bundled acknowledgments according to an embodiment of the invention.

FIG. 6 illustrates an embodiment of a procedure for selecting the number of bundled acknowledgments and taking the upper limit into account. The process may be understood as an embodiment of blocks 204 and 304 described above. The procedure starts in block 600. The procedure may be based on the following Equation (1) for an effective data rate G in bits per second:

$$G(R_{D/A}) = \frac{L_{pkt} * DR * R_{D/A}}{2 * D_l + R_{D/A} * L_{pkt} + L_{ACK} + (R_{D/A} - 1) * gt} \quad (1)$$

where $D_l$ is an unidirectional link delay in seconds including a propagation delay and, optionally, processing delays in the transmitter and/or in the receiver, $L_{pkt}$ is a length of a data packet in seconds, DR is a nominal data rate of the connection in bits per second, $R_{D/A}$ is the number of bundled acknowledgments, $L_{ACK}$ is the length of the acknowledgment message in seconds, and gt is a guard time between consecutive data packets in seconds. Equation (1) may be used to determine an optimal value for the $R_{D/A}$ with respect to the effective data rate G and the delay with the $D_l$ that defines the communication distance, e.g. $2*D_l$ may define the round-trip-time. In an embodiment, Equation (1) is used in the process of FIG. 6 iteratively where the communication distance and other parameters needed are first computed in block 602. Block 602 may also comprise selection of the upper limit. The data rate DR may be determined according to the bandwidth and other factors affecting the nominal data rate. Naturally, $R_{D/A}$ is unknown at this stage, and it may be initialized to a determined value that is known to be lower than the optimal number of bundled acknowledgments for the determined communication distance. The initial value of the $R_{D/A}$ may be lower for the lower communication distance and higher for the higher communication distance. The initialization may be carried out in block 604 when block 604 is executed for the first time and, otherwise, block 604 may increment the $R_{D/A}$ when block 604 is executed the next time. In block 606, Equation (1) is computed with the current value of $R_{D/A}$. In block 608, the $R_{D/A}$ is compared with the upper limit. If the upper limit has been reached, i.e. the $R_{D/A}$ is not below the upper limit, the process proceeds to block 610 in which the upper limit is selected as the value for the $R_{D/A}$. Thereafter, the process moves to block 614 in which the current value of the $R_{D/A}$ is selected for use in bundling the acknowledgments into the acknowledgment message. However, if the upper limit has not yet been reached, the process may proceed to block 612 in which the increase in the data rate with respect to the previous iteration is evaluated with respect to a reference value. The reference value may define the above-mentioned saturation point of the effective data rate G, e.g. it may define a point where the effective data rate G with respect to the increment of $R_{D/A}$ does not increase sufficiently anymore. In the first iteration, the comparison may be made with respect to effective data rate of zero bits/s or the process may simply skip block 612 and return to block 604. In the subsequent iterations, if it is determined in block 612 that the effective data does increase more than the minimum increase defined by the reference value, the process returns to block 604. On the other hand, if it is determined in block 612 that the effective data does not increase more than the minimum increase defined by the reference value, the process moves to block 614 in which the current value of $R_{D/A}$ is selected.

Obviously, there are other embodiments for using Equation (1) to derive the optimal value for $R_{D/A}$ with the above-mentioned conditions. The Actual computation of Equation (1) may be replaced by the provision of look-up tables in the apparatus determining the number of bundled acknowledgments. The apparatus may then replace blocks 604 to 614 by a single procedure in which it reads from look-up tables a value of the $R_{D/A}$ that is linked to the parameters determined in block 602. In such an embodiment, the use of the upper limit, for example, may be encoded into the look-up table values. Other equivalent mathematical methods are equally possible. Some embodiments may reduce the complexity of the computation by eliminating less significant parameters from Equation (1), e.g. the length of the data packets, the length of the acknowledgment message, and/or the guard time. The data rate may in some embodiments be maintained, because it may in some scenarios and in some implementations of the wireless communication system play a significant role on the behaviour of the function $G(R_{D/A})$. For example, in some scenarios the saturation of G is achieved sooner with the smaller nominal data rates.

Figure 7:
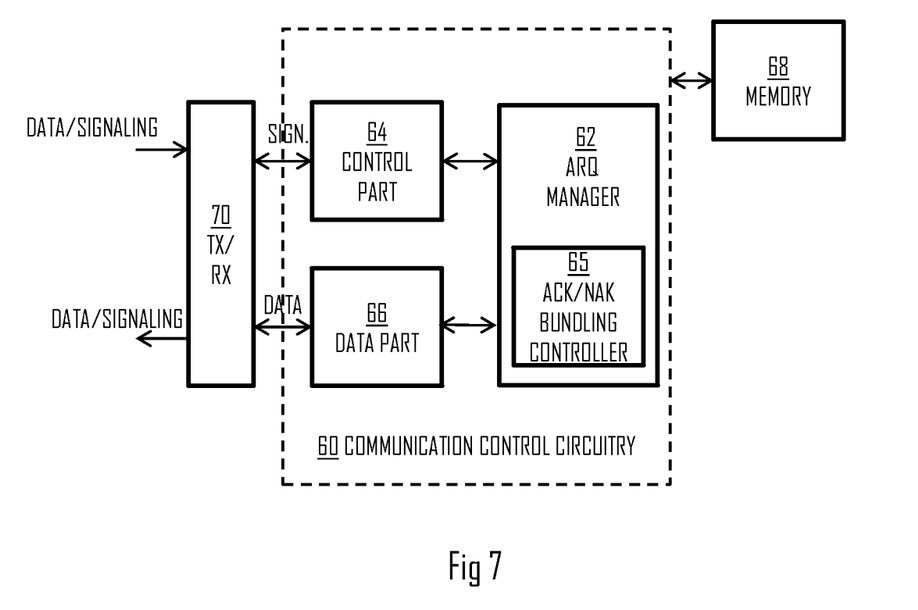
FIG. 7 illustrates a block diagram of a structure of an apparatus according to an embodiment of the invention.

FIG. 7 illustrates an embodiment of an apparatus comprising means for carrying out the functionalities of the network node 10 to 12 according to any one of the above-described embodiments. The apparatus may be a radio communication apparatus implemented as a portable device, e.g. a computer (PC), a laptop, a tabloid computer, a portable radio phone, a mobile radio platform (installed to a vehicle such as a truck or a ship), or any other apparatus provided with radio communication capability. In some embodiments, the apparatus is the vehicle equipped with the radio communication capability. In other embodiments, the apparatus is a fixed station, e.g. a base station. In further embodiments, the apparatus is comprised in any one of the above-mentioned apparatuses, e.g. the apparatus may comprise a circuitry, e.g. a chip, a processor, a micro controller, or a combination of such circuitries in the apparatus.

The apparatus may comprise a communication controller circuitry 60 configured to control the communications in the communication apparatus. The communication controller circuitry 60 may comprise a control part 64 handling control signalling communication with respect to establishment, operation, and termination of the radio connections. The control part 64 may also carry out any other control functionalities related to the operation of the radio links, e.g. transmission, reception, and extraction of the control messages, e.g. RTS/CTS messages, acknowledgment messages, and/or headers of data packets carrying control information such as the bundling command 502. The communication controller circuitry 60 may further comprise a data part 66 that handles transmission and reception of payload data over the radio links. The communication controller circuitry 60 may further comprise an ARQ manager circuitry 62 configured to handle the ARQ processes in the apparatus. The ARQ manager may process the acknowledgments for the data packets it has transmitted, and possible retransmissions, and for the data packets it has received. The ARQ manager circuitry 62 may comprise as a sub-circuitry an ACK/NAK bundling controller circuitry 65 configure to determine the number of acknowledgments bundled together into the same acknowledgment message. Depending on the embodiment, the ACK/NAK bundling controller circuitry 65 may determine the number of the bundled acknowledgments, e.g. the above-mentioned $R_{D/A}$, and transmit the bundling command through the control part 64 to the receiver in the header of a data packet or as a separate control message, or it may configure the control part to bundle the determined number of acknowledgments into the same acknowledgment message to be transmitted to the transmitter (embodiment of FIG. 3).

The circuitries 62 to 66 of the communication controller circuitry 60 may be carried out by the one or more physical circuitries or processors. In practice, the different circuitries may be realized by different computer program modules. Depending on the specifications and the design of the apparatus, the apparatus may comprise some of the circuitries 60 to 66 or all of them.

The apparatus may further comprise the memory 68 that stores computer programs (software) configuring the apparatus to perform the above-described functionalities of the network node 10 to 12. The memory 68 may also store communication parameters and other information needed for the radio communications. For example, the memory may store the above-mentioned value for the upper limit and the reference value. The memory 68 may serve as the buffer for data packets to be transmitted, the data packets that have not yet been acknowledged, and the acknowledgments that are being accumulated before the transmission of the acknowledgment message. The apparatus may further comprise radio interface components 70 providing the apparatus with radio communication capabilities with other network nodes. The radio interface components 70 may comprise standard well-known components such as amplifier, filter, frequency-converter, analogue-to-digital (A/D) and digital-to-analogue (D/A) converters, (de)modulator, and encoder/decoder circuitries and one or more antennas. The apparatus may further comprise a user interface enabling interaction with the user. The user interface may comprise a display, a keypad or a keyboard, a loudspeaker, a smartcard and/or fingerprint reader, etc.

An embodiment provides an apparatus comprising at least one processor and at least one memory including a computer program code, wherein the at least one memory and the computer program code are configured, with the at least one processor, to cause the apparatus to perform the functionalities of the network node 10 to 12 in the role of the transmitter and/or the receiver, as described above in connection with FIGS. 2 to 6.

As used in this application, the term 'circuitry' refers to all of the following: (a) hardware-only circuit implementations such as implementations in only analogue and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit or applications processor integrated circuit (ASIC) for the apparatus according to an embodiment of the invention.

The processes or methods described in FIGS. 2 to 6 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to cellular or mobile telecommunication systems defined above but also to other suitable telecommunication systems. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method for bundling data packet acknowledgments in a wireless communication device, the method comprising:
determining a metric proportional to a communication delay based distance between the wireless communication device and a counterpart wireless communication device;
selecting a number of data packet acknowledgments to be bundled together according to the communication delay based distance such that the higher the communication delay based distance is, the higher the number of data packet acknowledgments bundled together into a single acknowledgment message is, wherein the acknowledgment message comprises a positive acknowledgment indicating correct reception of one data packet and a negative acknowledgment indicating erroneous reception of another data packet; and
causing transmission of the acknowledgment message comprising the selected number of data packet acknowledgments.

2. The method of claim 1, wherein causing the transmission of the acknowledgment message comprises: causing the wireless communication device to transmit to the counterpart wireless communication device a message comprising an information element indicating the number of data packet acknowledgments the counterpart wireless communication device shall bundle together into the single acknowledgment message.

3. The method of claim 2, wherein the message is a data packet, wherein the information element is comprised in a header of the data packet.

4. The method of claim 1, further comprising:
determining a number of unacknowledged data packets transmitted by the wireless communication device to the counterpart wireless communication device; and upon the number of unacknowledged data packets reaching a value related to the selected number of data packet acknowledgments to be bundled together, causing the transmission of the message comprising a command that triggers immediate transmission of the acknowledgment message from the counterpart wireless communication device to the wireless communication device.

5. The method of claim 4, wherein the command is comprised as a one-bit indicator in the header of the data packet.

6. The method of claim 1, wherein the wireless communication device and the counterpart wireless communication device are provided with a capability to establish a radio link which extends beyond a radio horizon.

7. The method of claim 1, further comprising:
selecting the number of data packet acknowledgments to be bundled together according to the communication delay based distance and a data rate of a connection between the wireless communication device and the counterpart wireless communication device such that the higher the data rate is, the higher the number of data packet acknowledgments bundled together into a single acknowledgment message is.

8. The method of claim 1, further comprising setting an upper limit for the number of data packet acknowledgments to be bundled together into a single acknowledgment message.

9. The method of claim 1, wherein the communication delay based distance is estimated by utilizing at least one of the following parameters: known locations of the wireless communication device and the counterpart wireless communication device, a round-trip-time of the connection between the wireless communication device and the counterpart wireless communication device, a path loss estimate based on estimation of a received signal strength.

10. An apparatus comprising: at least one processor; and at least one memory including a computer program code, wherein the at least one memory and the computer program code are configured, with the at least one processor, to perform operations comprising:
determining a metric proportional to a communication delay based distance between the apparatus and a counterpart apparatus;
selecting a number of data packet acknowledgments to be bundled together according to the communication delay based distance such that the higher the communication delay based distance is, the higher the number of data packet acknowledgments bundled together into a single acknowledgment message is, wherein the acknowledgment message comprises a positive acknowledgment indicating correct reception of one data packet and a negative acknowledgment indicating erroneous reception of another data packet; and
causing transmission of the acknowledgment message comprising the selected number of data packet acknowledgments.

11. The apparatus of claim 10, wherein the operations further comprise, in said causing the transmission of the acknowledgment message, causing the apparatus to transmit to the counterpart apparatus a message comprising an information element indicating the number of data packet acknowledgments the counterpart apparatus shall bundle together into the single acknowledgment message.

12. The apparatus of claim 11, wherein the message is a data packet, wherein the information element is comprised in a header of the data packet.

13. The apparatus of claim 10, wherein the operations further comprise:
- determining a number of unacknowledged data packets transmitted by the apparatus to the counterpart apparatus; and
- upon the number of unacknowledged data packets reaching a value related to the selected number of data packet acknowledgments to be bundled together, causing the transmission of the message comprising a command that triggers immediate transmission of the acknowledgment message from the counterpart apparatus to the apparatus.

14. The apparatus of claim 13, wherein the command is comprised as a one-bit indicator in the header of the data packet.

15. The apparatus of claim 10, wherein the apparatus and the counterpart apparatus are provided with a capability to establish a radio link which extends beyond a radio horizon.

16. The apparatus of claim 10, wherein the operations further comprise causing the apparatus to select the number of data packet acknowledgments to be bundled together according to the communication delay based distance and a data rate of a connection between the apparatus and the counterpart apparatus such that the higher the data rate is, the higher the number of data packet acknowledgments bundled together into a single acknowledgment message is.

17. The apparatus of claim 10, wherein the operations further comprise causing the apparatus to set an upper limit for the number of data packet acknowledgments to be bundled together into a single acknowledgment message.

18. The apparatus of claim 10, wherein the operations further comprise causing the apparatus to estimate the communication delay based distance by utilizing at least one of the following parameters: known locations of the apparatus and the counterpart apparatus, a round-trip-time of the connection between the apparatus and the counterpart apparatus, a path loss estimate based on estimation of a received signal strength.

19. The method of claim 1, wherein the acknowledgement message comprises a separate data packet acknowledgement for each of a plurality of data packets.

20. The apparatus of claim 10, wherein the acknowledgement message comprises a separate data packet acknowledgement for each of a plurality of data packets.

\* \* \* \* \*